March 8, 1966  W. F. HARRISON  3,239,286
LOW-TORQUE BUSHING ASSEMBLY
Filed June 21, 1962

INVENTOR
William F. Harrison
BY McCoy, Greene & Te Grotenhuis
ATTORNEYS

United States Patent Office 3,239,286
Patented Mar. 8, 1966

3,239,286
LOW-TORQUE BUSHING ASSEMBLY
William F. Harrison, Logansport, Ind., assignor to The General Tire & Rubber Company, Akron, Ohio, a corporation of Ohio
Filed June 21, 1962, Ser. No. 204,145
7 Claims. (Cl. 308—26)

This invention relates to low-torque bushing assemblies having internal means of insulating internal and external members from relative vibration and shock, and to compensate for misalignment of a shaft or pivot pin with which it is used.

The assembly comprises generally an annular insert of elastic rubber compressed radially between rigid inner and outer tubular members and a tubular plastic member internally sealed between the rubber insert and the inner tubular member. It is preferable that the tubular plastic member have a low-friction cylindrical bearing surface within which the inner member may rotate under torsional stresses. The low friction material is preferably a resilient plastic material such as nylon, polytetrafluoroethylene (such as sold under the trademark "Teflon") or a linear acetal consisting of unbridged polyoxymethylene chains of great length (such as sold under the trademark "Delrin").

The bushing assembly of the present invention is particularly useful because it minimizes friction and wear and has a long useful life. These advantages are due to a large extent to a novel means of sealing lubricant within the assembly and of preventing dirt from reaching the bearing surfaces. The arrangement of parts is such as to permit manufacture by mass production methods. Furthermore, the particular arrangement of the parts protects the rubber and the bearing against wear or deterioration.

An object of the present invention is to provide a cushioned bushing assembly having lubricant sealed therein.

Another object of the present invention is to provide a bushing assembly having improved means for sealing the end portions of the assembly.

A still further object of the invention is to provide a cushioned bushing assembly in which the inner sleeve is free to rotate within a bearing member with a minimum of friction.

Other objects, uses and advantages of this invention will become apparent from the following description and claims and from the drawings in which:

Figure 1:
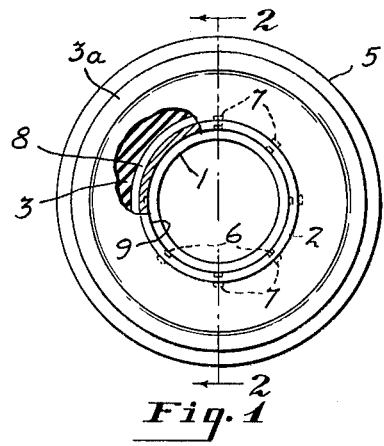
FIGURE 1 is an end elevation of a rubber bushing assembly embodying the invention with parts broken away and shown in section.
Figure 2:
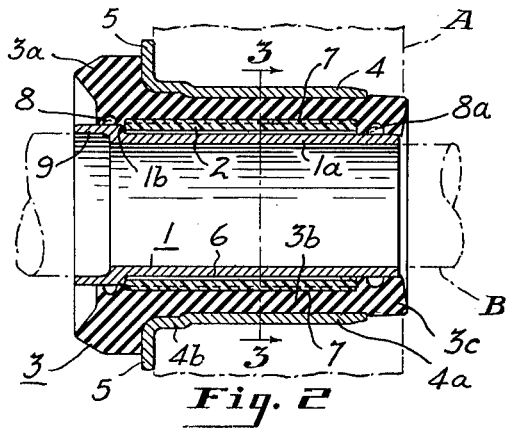
FIGURE 2 is a longitudinal sectional view of the same assembly taken on the line 2—2 of FIGURE 1 and on the same scale.
Figure 3:
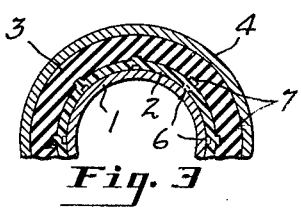
FIGURE 3 is a fragmentary transverse sectional view of the same assembly taken on the line 3—3 of FIGURE 2 and on the same scale.

Referring more particularly to the drawings which are drawn substantially to scale, FIGURES 1, 2 and 3 show a bushing assembly that is interposed between an outer supporting member A and an inner shaft or pin B which turns relative to the member A (the members A and B being shown in dot-dash lines in FIGURE 2). The assembly comprises a rigid inner tubular member or sleeve 1, a concentric intermediate tubular bearing member or sleeve 2 of a size to fit on the sleeve 1, an annular elastic rubber insert 3, and a rigid outer tubular member or sleeve 4 concentric to the members 1 and 2. The inner and outer sleeves 1 and 4 are preferably formed of steel or other strong metal, and the intermediate bearing member 2 is preferably formed of a softer material having a low coefficient of friction such as nylon, Teflon, Delrin, or other hard, strong, resilient, synthetic resin (plastic) material.

As herein shown, the inner sleeve 1 has a cylindrical portion 1a with an internal diameter corresponding substantially to the external diameter of the shaft B and has a short cylindrical portion 9 which fits on the enlarged portion of the shaft B, the sleeve having a shoulder 1b at the junction of the two cylindrical portions for engaging the end of the bearing sleeve 2.

The sleeve 2 preferably contains a series of longitudinal grooves 6 in its inner surface which are regularly spaced around its periphery as shown in FIGURES 1 and 3, and the outer surface of the sleeve 2 preferably has parallel longitudinal ridges 7 regularly spaced about its periphery to provide means for restraining turning movement of the sleeve 2 with respect to the annular rubber insert 3. When the bushing is assembled, the ridges 7 deform the internal surface 30 of the rubber insert as indicated in FIGURE 3, and it is, therefore, unnecessary to provide molded grooves in the rubber to receive the ridges 7.

The longitudinal grooves 6 in the inner surface of the sleeve 2 are preferably filled with a suitable lubricant such as a grease to facilitate relative rotation between parts 1 and 2 which may be due to continuous or occasional turning of the shaft B.

Figure 4:
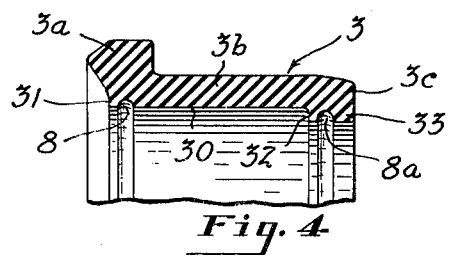
FIGURE 4 is a fragmentary longitudinal section of the elastic inner part of the assembly in the normal unstressed state on the same scale as FIGURES 1 to 3.

FIGURE 4 shows the shape of the rubber insert 3 in its normal unstressed condition prior to assembly. The insert comprises an enlarged thickened end portion or flange 3a, a cylindrical portion 3b, and a thickened end portion 3c which projects radially inwardly from the cylindrical portion. The portion 3a is shaped to provide an annular groove 8 and a narrow lip 31 at the side of said groove, and the end portion 3c is shaped to provide a similar annular groove 8a, a lip 32 at one side of said groove and an annular portion or lip 33 on the other side of said groove. The construction of the rubber insert will be apparent from FIGURE 4. As shown in that figure, the portion 3b has a cylindrical internal surface 30 with an internal diameter slightly less than the external diameter of the bearing member 2 which extends from the groove 8 to the shoulder provided by the lip 32, the length of the surface 30 being sufficient to accommodate the bearing member 2 when the rubber insert is radially compressed as shown in FIGURE 2. The internal cylindrical surface of the lip 31 preferably has the same radius as the surface 30 and is aligned axially therewith. The internal cylindrical surfaces of the annular portions 32 and 33 on opposite sides of the groove 8a are axially aligned and have the same radius. The difference between the radii of the surfaces 30 and 32 is preferably equal to or slightly greater than the radial thickness of the bearing sleeve 2 so that the portions 32 and 33 will engage the inner sleeve 1 near the end thereof to provide an effective seal as shown in FIGURE 2. The cylindrical end portion 9 of the inner sleeve 1 is of a size such that the surfaces at opposite sides of the groove 8 will similarly engage the inner sleeve to provide an effective seal. The double seals provided at opposite ends of the bearing sleeve 2 hold the lubricant within the grooves 6 and prevent foreign matter from contacting the bearing surfaces.

The annular grooves 8 and 8a increase the flexibility of the rubber contacting the inner sleeve 1 and thereby insures better contact between the rubber insert and the inner sleeve. Another function of said grooves is to provide a double seal at each end of the assembly including two annular zones of surface contact between the rubber insert and the inner member 1.

The outer sleeve 4 is preferably provided with a radial flange 5 for engaging the head 3a and is preferably shaped to facilitate assembly. As herein shown, the outer sleeve 4 has a relatively long cylindrical portion 4a and a relatively short cylindrical portion 4b with an internal diameter somewhat greater than that of the portion 4a to facilitate insertion of the insert 3 into the sleeve 4. The insert 3 is also specially shaped to facilitate assembly as shown in FIGURE 4.

The sizes of the parts may vary considerably. However, the outer sleeve 4 is preferably shorter than the rubber insert 3 as shown in FIGURE 2 so that the end portions 3a and 3c extend radially beyond the adjacent internal surface of the outer sleeve and prevent axial movement of the outer sleeve. The length of the sleeve 4 is usually at least one-half the total length of the assembled bushing and is usually not substantially greater than the length of the bearing sleeve 2. In the bushing assembly of FIGURES 1 to 3 the members 2 and 4 usually have an axial length which is 0.6 to 0.9 times the axial length of the inner sleeve 1. The inner sleeve 1 is of greater length than bearing member 2 to provide surfaces for sealing engagement with the portions of the rubber insert at opposite sides of each groove 8 or 8a whereby an effective double seal is provided at each end of the assembly. However, the sleeve 2 is preferably axially elongated so that the area of contact between the inner metal sleeve 1 and the rubber insert is relatively small. Normally the bearing member 2 extends two-thirds to eight-tenths the distance from the outer surface of the lip 31 to the outer surface of the lip 33 at the end of the insert. As shown in FIGURE 2, the sleeve 2 extends substantially from the shoulder 1b to the lip 32.

The relative thickness of the parts may vary considerably, but the rubber insert is preferably shaped so that its cylindrical portion 3b has a length several times (i.e., 3 to 8 times) its radial thickness when in its normal unstressed condition. When the bushing is assembled the cylindrical portion 3b is compressed radially so as to increase the axial length of the rubber insert a substantial amount (i.e., 20 to 40%).

The metal members 1 and 4 and the bearing member 2 are preferably axially elongated and relatively thin. The thickness of these parts may, for example, be less than 1/10 of their diameter. Usually the axial length of these parts is 10 to 30 times their radial thickness. When the bushing is assembled as shown in FIGURE 2, the radially compressed portion 3b of the rubber insert usually has a radial thickness 3 to 10 times the radial thickness of the parts 1, 2 and 4 so as to provide an effective cushion. It will be understood, however, that the dimensions mentioned above are for purposes of illustration rather than limitation and the advantages of the invention may be obtained even though the dimensions vary considerably.

It will be apparent to those skilled in the art that the bushing assembly of FIGURES 1 to 4 may be assembled easily using conventional methods. The preferred method of assembly is to place the rubber insert 3 within the outer sleeve 4, to insert the sleeve 1 into the bearing member 2 (which has an internal diameter corresponding substantially to the external diameter of the portion 1a), and thereafter to force the parts 1 and 2 axially into the insert 3 to compress the rubber. Such assembly may be performed, for example, using well known methods as disclosed in U.S. Patent No. 2,872,727 or U.S. Patent No. 2,947,070.

This assembly operation places the rubber of the insert 3 under substantial radial compression and causes it to be elongated to at least 110% of its original length. The compression of the rubber causes the inner surface of the rubber insert to firmly grip the outer surface of the bearing member 2 and holds the parts against relative axial movement while at the same time holding the bearing member against rotation.

Figure 5:
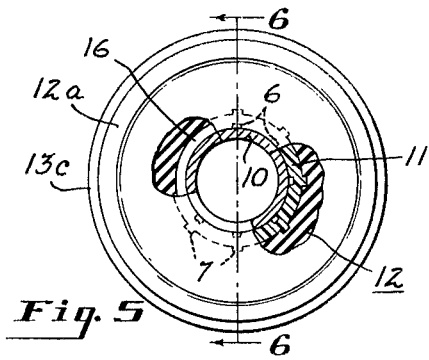
FIGURE 5 is an end elevational view of another bushing assembly embodying the invention with parts broken away and shown in section.
Figure 6:
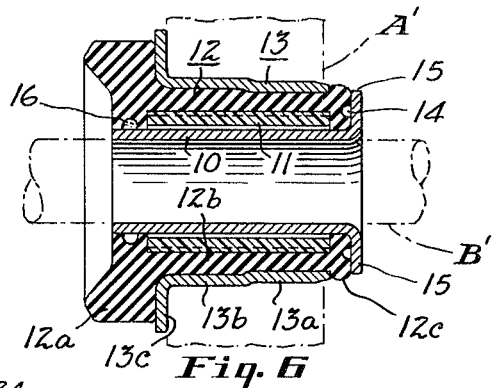
FIGURE 6 is a longitudinal sectional view of the assembly shown in FIGURE 5.

FIGURES 5 and 6 show a modified form of the invention which functions generally like the bushing assembly previously described. The modified bushing assembly is mounted between an outer supporting member A' and an inner shaft or pivot pin B' which turns relative to the member A'. The bushing assembly comprises an inner tubular member or sleeve 10 having a radial flange 15, an intermediate tubular bearing member or sleeve 11 having an internal diameter substantially equal to the external diameter of the sleeve 10 and an axial length substantially less than that of the sleeve 10, a rubber insert 12, and an outer tubular member or sleeve 13 concentric to the members 10 and 11.

The rubber insert 12 is somewhat similar to the insert 3 in that it has a radially projecting head or flange 12a, a cylindrical portion 12b and a thickened end portion 12c, but differs from the insert 3 in that the internal diameters of the end portions 12a and 12c are substantially the same so as to provide a groove between said end portions of a size to receive the bearing member 11. The insert 12 further differs from the insert 3 in that the annular groove 14 of the end portion 12c is spaced radially from the internal cylindrical surface of the end portion so as to face the radial flange 15 of the inner sleeve. The outer end surfaces at the marginal inner and outer edges of the groove 14 engage the flange 15 to provide an effective double seal. A double seal is also provided at the opposite end of the assembly, the portion 12a having an annular groove 16 similar to the groove 8. The portions of the rubber insert at opposite sides of the groove 16 engage the periphery of the inner sleeve 10 to provide an effective double seal similar to that of the bushing assembly of FIGURES 1 to 3.

The outer metal sleeve 13 shown herein has cylindrical portions 13a and 13b and a radial flange 13c which engages the flange portion 12a, the portion 13b being of larger diameter than the portion 13a to facilitate assembly.

The bearing member 11 is provided with longitudinal grooves 6 in its internal surface and longitudinal ribs 7 in its external surface like the bearing member 2 described above, and a further description of such bearing member is believed unnecessary.

The parts 10, 11, 12 and 13 may have relative sizes comparable to those employed in the bushing assembly first described herein. The axial length of the members 11 and 13 is usually 0.6 to 0.9 times the axial length of the inner sleeve 10.

Figure 7:
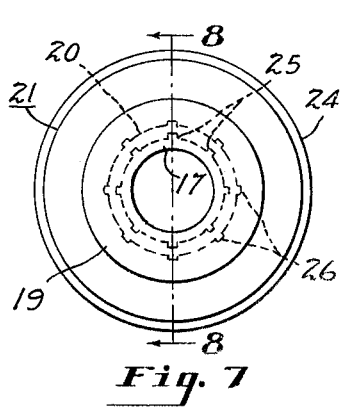
FIGURE 7 is an end elevational view of another modified form of the invention.
Figure 8:
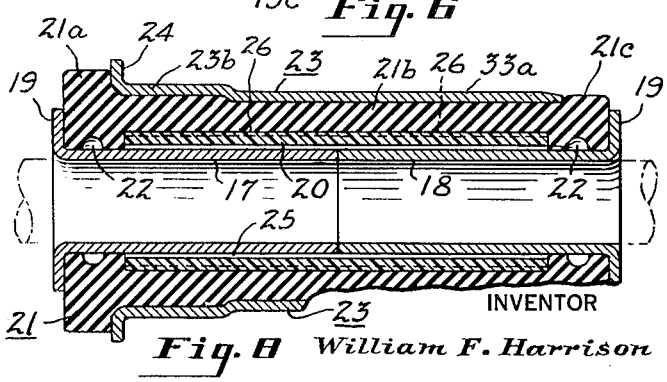
FIGURE 8 is a fragmentary longitudinal sectional view of the assembly shown in FIGURE 7.

FIGURES 7 and 8 show another modified form of bushing assembly according to this invention, including an inner sleeve (17, 18), an intermediate tubular bearing member or sleeve 20 having an internal diameter substantially equal to the external diameter of said inner sleeve, an annular rubber insert 21 of elastic rubber, and an outer tubular metal member or sleeve 23 concentric to the bearing member 20.

The inner sleeve is formed of two parts 17 and 18 of exactly the same size, each having a radial flange 19. The ends of the parts 17 and 18 are substantially in engagement in the final assembly as shown in FIGURE 8, but they may be separated by a small amount to insure contact between the flanges 19 and the ends of the rubber insert.

The rubber insert 21 is molded to be symmetrical except for the radial flange at 21a and comprises a thickened portion 21a, a cylindrical axially elongated portion 21b and a thickened end portion 21c similar to the portion 21a but having an external diameter no greater than that of the portion 21b so as to facilitate assembly. Each of the end portions 21a and 21c is provided with an annular groove 22, the portions of the rubber insert at the sides of each groove sealingly engaging the outer peripheral surface of the inner sleeve (17, 18).

The intermediate tubular bearing member 20 is shaped like the bearing members 2 and 11 and is made of the same resilient plastic material (i.e., nylon, Teflon or Delrin). As herein shown, the bearing member 20 has a series of regularly spaced parallel longitudinal lubricant-receiving grooves 25 in its inner surface and a series of regularly spaced parallel ridges or lands 26 in its outer surface. The bearing member thus functions like the bearing members previously described.

The outer tubular member 23 is preferably provided with a radial flange 24 for engaging the head 21a and is preferably enlarged at one end to facilitate assembly. As herein shown, the sleeve 23 has a cylindrical portion 23a extending more than half its overall length and a second cylindrical portion 23b of increased diameter to facilitate insertion of the insert 21.

The sizes of the parts shown in FIGURES 7 and 8 may vary considerably but usually the bearing member 20 and the outer sleeve 23 have an axial length which is about 0.7 to 0.9 times the axial length of the inner sleeve (17, 18) and have a radial thickness about 0.1 to 0.4 times the radial thickness of the portion 21b compressed between the bearing member and the outer sleeve. The inner sleeve (17, 18) usually has a length which is at least 4 times its internal diameter and the parts 20 and 23 are preferably axially elongated.

It will be understood that the above description is by way of illustration rather than limitation and that, in accordance with the provisions of the patent laws, variations and modifications of the specific devices herein shown and described may be made without departing from the spirit of the invention.

Having described my invention, I claim:

1. A low-torque bushing assembly comprising rigid tubular means forming an axially elongated externally cylindrical inner sleeve of circular cross section; a rigid axially elongated outer sleeve; an intermediate bearing sleeve of resilient synthetic resin material positioned between said inner and outer sleeves and concentric thereto, said intermediate bearing sleeve having external longitudinal ribs and a multiplicity of lubricant retaining grooves which are located in the inner surface thereof; and an annular elastic rubber insert radially compressed between the outer and intermediate sleeves to increase the axial length of the unstressed insert at least 20%, said rubber insert in the unstressed condition having a radially projecting portion at each end with an annular groove therein, the end portions of said rubber insert contacting each end portion of the inner sleeve at the ends of said intermediate bearing sleeve and at surface areas adjacent to the ends of the intermediate sleeve near each edge of each of the annular grooves to provide a double seal at each end of the bushing assembly.

2. A bushing assembly as defined in claim 1 wherein the end portions of the unstressed rubber insert project radially inwardly to provide annular shoulders, said shoulders being located in said bushing at the opposite ends of said bearing sleeve, said inner sleeve has integral radial flanges engaging the opposite end portions of said rubber insert, and said end portions of said rubber insert engage the external cylindrical surfaces of said inner sleeve at the bases of said flanges and at the ends of said bearing sleeve.

3. A bushing assembly as defined in claim 1 wherein the inner sleeve has a radial flange at one end and the corresponding end surface of the rubber insert has an annular groove facing the surface of said flange, and wherein the concentric end surfaces of the rubber insert contact the said flanged surface at each edge of the last-named groove to provide a double seal.

4. A bushing assembly as defined in claim 1 in which the said inner sleeve comprises two axially elongated parts of substantially the same diameter which meet within the intermediate sleeve and which have radial flanges at each end of the sleeve; and in which the rubber insert has annular end surfaces which contact the said radial flanges near the outer periphery of each radial flange.

5. A low-torque bushing assembly comprising two rigid concentric tubular members of circular cross section, a tubular plastic bearing member of a size to fit over the inner tubular member positioned between said rigid members and having an axial length less than that of said inner tubular member, and an annular elastic rubber insert radially compressed between said outer tubular member and said bearing member so as to increase its axial length 20 to 40 percent; said insert in the normal unstressed condition prior to assembly having a cylindrical central bearing-receiving portion and thickened end portions, each having an annular groove in its inner peripheral surface, one of said end portions having an internal diameter which is slightly less than the internal diameter of said cylindrical portion to provide an annular shoulder at the end of said cylindrical portion with a radial height no less than the radial thickness of said bearing member and the other of said end portions of the insert in said unstressed condition having an internal diameter substantially equal to that of said cylindrical portion to facilitate insertion of said inner tubular member; said inner tubular member having a cylindrical external surface with an external diameter substantially equal to the internal diameter of said bearing member and an axial length greater than that of said bearing member which engages said one of said end portions of said insert on both sides of the annular groove thereof and an enlarged cylindrical portion adjacent the end of said bearing member which engages said other of said end portions of said insert on both sides of the annular groove thereof.

6. A bushing assembly as defined in claim 5 wherein the radially compressed rubber insert has an axial length at least equal to that of said inner tubular member and the cylindrical portion thereof compressed between the intermediate and outer tubular members has a radial thickness which is about 3 to 10 times the radial thickness of said rigid members, said bearing member and said outer tubular member being elongated axially and having a length which is about 0.6 to 0.9 times the length of said inner tubular member, said bearing member having a series of longitudinal lubricant-retaining grooves located in the inner surface thereof and extending between the end portions of said bearing member.

7. A low-torque bushing assembly comprising two rigid concentric tubular members of circular cross section, a tubular bearing member formed of a synthetic resin material and having an internally cylindrical surface with a series of longitudinal lubricant-receiving grooves, and an annular elastic rubber insert radially compressed between said outer tubular member and said bearing member so as to increase the axial length of said insert at least 20 percent, said insert in the normal unstressed condition prior to assembly having a cylindrical central bearing-receiving portion and thickened end portions, each having an annular groove in its inner peripheral surface, one thickened end portion of said rubber insert having an internal diameter which is slightly less than the internal diameter of said cylindrical portion to provide an annular shoulder at one end of said cylindrical portion and the other thickened end portion having an internal diameter greater than that of said one thickened end portion to facilitate insertion of said inner tubular member, said inner tubular member having a cylindrical external bearing surface with a diameter substantially equal to the internal diameter of said bearing member and an axial length greater than that of said bearing member which engages said one thickened end portion of said insert on both sides of the annular groove thereof to seal one end of said bearing member and having an enlarged cylindrical portion near the opposite end of said bearing member with a cylindrical external surface which engages said other thickened end portion on both sides of the annular groove thereof to seal the other end of said bearing member, the end of said bearing member engaging a shoulder of said inner tubular member formed between said bearing surface and the external surface of said enlarged cylindrical portion.

References Cited by the Examiner

UNITED STATES PATENTS

| | | | |
|---|---|---|---|
| 1,993,260 | 3/1935 | Burns | 287—85 X |
| 2,851,314 | 9/1958 | Thomson | 308—26 |
| 2,952,486 | 9/1960 | Reuter | 287—85 |
| 2,981,573 | 4/1961 | Reuter | 308—238 |
| 2,983,555 | 5/1961 | Miller | 308—72 |
| 3,009,746 | 11/1961 | Haushalter | 308—26 |
| 3,039,831 | 6/1962 | Thomas | 308—26 |
| 3,070,408 | 12/1962 | Reuter | 308—238 |
| 3,112,141 | 11/1963 | Peras | 308—184 |
| 3,133,769 | 5/1964 | Drake | 308—26 |

FOREIGN PATENTS

| | | |
|---|---|---|
| 1,236,910 | 6/1960 | France. |
| 1,237,662 | 6/1960 | France. |

DON A. WAITE, *Primary Examiner.*

ROBERT C. RIORDON, *Examiner.*